United States Patent
Kim et al.

(10) Patent No.: US 11,554,729 B2
(45) Date of Patent: Jan. 17, 2023

(54) VEHICLE ROOF LINING INCLUDING A MULTIFUNCTION PLATE

(71) Applicants: HYUNDAI MOTOR COMPANY, Seoul (KR); KIA MOTORS CORPORATION, Seoul (KR)

(72) Inventors: Ji Ah Kim, Seoul (KR); Jin Ho Hwang, Cheonan-si (KR); Min Ho Cho, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/099,225

(22) Filed: Nov. 16, 2020

(65) Prior Publication Data
US 2021/0323487 A1    Oct. 21, 2021

(30) Foreign Application Priority Data
Apr. 21, 2020    (KR) ........................ 10-2020-0048144

(51) Int. Cl.
*B60R 13/08*    (2006.01)

(52) U.S. Cl.
CPC .. *B60R 13/0823* (2013.01); *B60R 2013/0807* (2013.01)

(58) Field of Classification Search
CPC ........................ B60R 13/0823; B60R 21/026
USPC .................. 296/24.4, 24.43, 24.46
See application file for complete search history.

(56) References Cited

U.S. PATENT DOCUMENTS

| | | | |
|---|---|---|---|
| 6,095,060 A * | 8/2000 | Ma | B60N 3/002 |
| | | | 108/44 |
| 2009/0079221 A1 * | 3/2009 | Marshall | B60J 3/0269 |
| | | | 296/97.4 |
| 2019/0248263 A1 | 8/2019 | Nagatomi | |
| 2022/0063520 A1 * | 3/2022 | Ohno | B60N 2/91 |

FOREIGN PATENT DOCUMENTS

| | | | | |
|---|---|---|---|---|
| CN | 201922983 U | * | 8/2011 | |
| CN | 110154852 A | | 8/2019 | |
| DE | 102005031070 A1 | * | 1/2007 | ............ B60R 13/01 |
| DE | 102017116209 A1 | * | 1/2018 | ............ B60R 1/00 |
| DE | 102019101411 A1 | * | 7/2020 | ........ B60R 11/0235 |
| EP | 2535223 A1 | * | 12/2012 | ............ B60P 3/205 |
| FR | 2491407 A1 | * | 4/1982 | ............ A47B 5/06 |
| FR | 2862580 A1 | * | 5/2005 | .......... B60N 2/2824 |
| FR | 2909329 A1 | * | 6/2008 | ............ B60R 11/00 |
| FR | 2934523 A1 | * | 2/2010 | ............ B60J 7/04 |
| FR | 2935318 A1 | * | 3/2010 | ............ B60R 5/003 |

(Continued)

OTHER PUBLICATIONS

Machine translation from espacenet for FR 3034731A1 (Year: 2016).*

*Primary Examiner* — Hilary L Gutman
(74) *Attorney, Agent, or Firm* — Lempia Summerfield Katz LLC

(57) ABSTRACT

A vehicle roof lining includes a roof lining, a rail structure, a multifunction plate, and sleds. The rail structure is provided on both side edges of the roof lining. The multifunction plate is provided on the roof lining, with one edge of the multifunction plate being movable along the rail structure. The sleds are movable along inner portions of the rail structure and are fastened with one edge of the multifunction plate.

16 Claims, 8 Drawing Sheets

(56) References Cited

FOREIGN PATENT DOCUMENTS

| FR | 2998839 | A1 | * | 6/2014 | ............. | B60N 3/002 |
| FR | 3005911 | A1 | * | 11/2014 | ............. | B60P 3/205 |
| FR | 3034731 | A1 | * | 10/2016 | ............... | B60N 2/36 |
| FR | 3094304 | A1 | * | 10/2020 | ........... | B60R 21/026 |
| JP | H10226257 | A | | 8/1998 | | |

* cited by examiner

[ SIDE VIEW ]

[ TOP VIEW ]

VEHICLE ROOF LINING INCLUDING A MULTIFUNCTION PLATE

CROSS REFERENCE TO RELATED APPLICATION

The present application claims priority to Korean Patent Application No. 10-2020-0048144, filed Apr. 21, 2020, the entire contents of which are incorporated herein for all purposes by this reference.

BACKGROUND

Field of the Disclosure

The present disclosure relates generally to a vehicle roof lining including a multifunction plate. More particularly, the present disclosure relates to a vehicle roof lining including a multifunction plate comprised of two adjacent plates, the multifunction plate being stowed on the vehicle roof lining and being extendable at a request from a user to provide a private space or a table.

Description of the Related Art

Generally, modern people who spend a long time inside a vehicle require a passenger table to be used during stowing or stopping of a vehicle for a variety of reasons. Furthermore, according to demand for a private space, configurations providing a variety of partition functions are provided.

For example, in the related art, a solution of disposing a table between a front seat area and a rear seat area has been disclosed. The table is positioned by fitting one end of a stand to a boss provided on the bottom of a vehicle cabin and the other end of the stand to a boss provided on the bottom of the table.

However, in a case in which separate components for a partition function are included and a detachable table is provided as described above, spaces for accommodating a partition plate and a table plate are required. In addition, it may be inconvenient since the respective plates must be operated at a request from a user.

Therefore, a single plate able to provide a variety of functions while providing a variety of entertainment environments is required. At the same time, the plate is required to be able to be used as a partition and a table by simple operations.

The foregoing is intended merely to aid in the understanding of the background of the present disclosure. The foregoing is not intended to mean that the present disclosure falls within the purview of the related art that is already known to those having ordinary skill in the art.

SUMMARY

Accordingly, the present disclosure has been made keeping in mind the above problems occurring in the related art. The present disclosure is intended to propose a vehicle roof lining including an extendable multifunction plate stowed on a roof lining.

The present disclosure is also intended to propose a vehicle roof lining including a multifunction plate able to provide a partition to either a driver or a passenger.

The present disclosure is also intended to propose a vehicle roof lining including a multifunction plate serving as a height-adjustable table.

Objectives of the present disclosure are not limited to the above objectives. Other and further objectives of the present disclosure should become apparent upon understanding of the various embodiments described below. Further, the objectives of the present disclosure may be realized by means and combinations thereof indicated in the appended claims.

In order to achieve at least one of the above objectives, the vehicle roof lining including a multifunction plate includes the following configurations.

According to an embodiment of the present disclosure, a vehicle roof lining may include: a roof lining; a rail structure provided on both side edges of the roof lining; a multifunction plate provided on the roof lining, with one edge of the multifunction plate being movable along the rail structure; and sleds movable along inner portions of the rail structure and fastened with one edge of the multifunction plate.

The multifunction plate may include: a first plate provided in a position opposing a driver's seat; a second plate configured to telescope over the first plate about one edge of the first plate; and frames respectively provided on at least a portion of each of both side edges of the multifunction plate, the frames being fastened with the sleds.

The vehicle roof lining may further include fixing pins provided on the frames to fix the first plate and the second plate to the frames.

When the fixing pins are unfastened, the first plate and the second plate may be moved downwards while being parallel to the roof lining.

Each of the frames may include a leg, one end thereof being located on a corresponding one of the first plate and the second plate, and the other end thereof being located on a corresponding one of the sleds. Each of the frames may also include an intermediate leg, one end thereof being located on the corresponding one of the first plate and the second plate, and the other end thereof being fastened with the leg. The leg and the intermediate leg may be extended when the corresponding one of the first plate and the second plate is moved downwards.

The legs may be moved along the rail structure so that an extended height of either the first plate or the second plate is adjustable.

The vehicle roof lining may further include a holder provided on a front edge of the multifunction plate. The holder may be selectively fastened with the roof lining.

When the holder is unfastened, the front edge of the multifunction plate may be extended downwards.

When the front edge of the multifunction plate is extended downwards, the sleds may be moved in a forward direction of the vehicle.

An opening may be provided in at least one end of the rail structure facing one edge of the second plate.

In a position facing the opening, the sleds may be attached to or detached from the rail structure in a direction of rotation of the second plate.

One edge of the second plate detached from the rail structure may be fastened with a front edge of the roof lining.

Each of the sleds may include an electromagnet movable along the rail structure and a holder fastened with the electromagnet and located on one edge of the multifunction plate.

The holder may be selectively attached to or detached from the electromagnet.

Each of the sleds may include a clamp movable along the rail structure and a holder fastened with the clamp and located on one edge of the multifunction plate.

The multifunction plate may be a transparent display.

The present disclosure may achieve the follow effects from the configurations described above and configurations described below, as well as combinations and relationships of use thereof.

The vehicle roof lining including a multifunction plate according to the present disclosure may improve user convenience.

In addition, the vehicle roof lining including a multifunction plate according to the present disclosure may allow either a driver or a passenger to have privacy.

In addition, the vehicle roof lining including a multifunction plate according to the present disclosure may provide a height-adjustable table, thereby improving user convenience.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Embodiments of the present disclosure are described below in more detail with reference to the accompanying drawings. The present disclosure may, however, be embodied in different forms and should not be constructed as limited to the embodiments set forth herein. Rather, these embodiments are provided so that this disclosure will be thorough and complete, and will fully convey the scope of the present disclosure to those of ordinary skill in the art.

In addition, terms, such as "unit" and "module", as used herein may indicate a unit for processing at least one function or operation, which may be implemented by hardware, software, or a combination thereof.

In addition, terms, such as first and second, may be used herein when describing components of the present disclosure. These terminologies are not used to define the order or sequence of corresponding components but used merely to distinguish the corresponding component from other components having the same name.

The present disclosure relates to a roof lining 100 including a multifunction plate 300. The multifunction plate 300 of the roof lining 100 may be implemented as a transparent display and may serve to provide a partition between passengers and a table.

More particularly, the display unit of the multifunction plate 300 may include any type of display panels known in the art.

The multifunction plate 300 may be configured to move back and forth along a rail structure or rails 200 located on both side edges of the roof of the vehicle or to move using an inner rail of the rails 200 of a sunroof 500 located on the roof of the vehicle.

Figure 1:
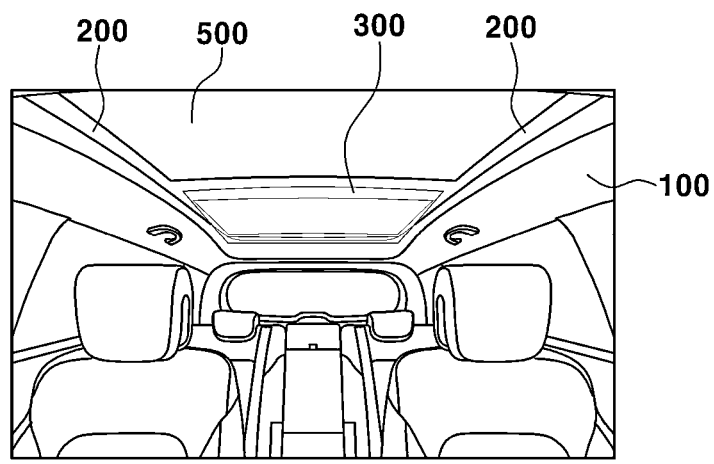
FIG. 1 illustrates a vehicle cabin in which a vehicle roof lining including a multifunction plate is stowed.
Figure 2:
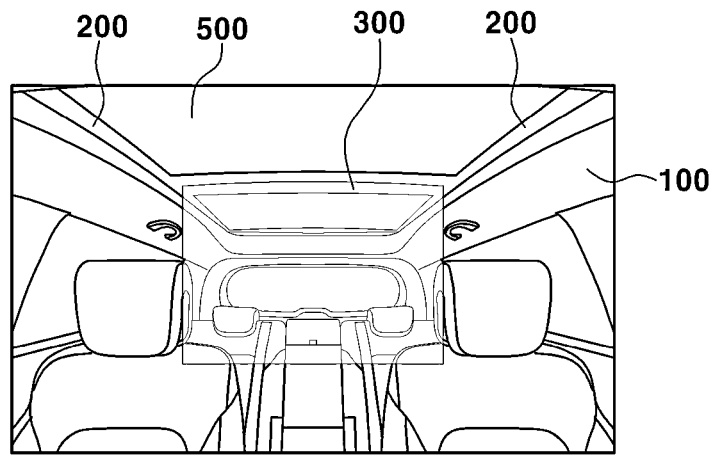
FIG. 2 illustrates the vehicle cabin in which the vehicle roof lining including a multifunction plate is extended.

FIGS. 1 and 2 illustrate a cabin of a vehicle in which the roof lining 100 including the multifunction plate 300 according to an embodiment of the present disclosure is disposed.

As illustrated in FIG. 1, the multifunction plate 300 may be configured to be disposed parallel to the roof lining 100 in a stowed position. As illustrated in FIG. 2, the multifunction plate 300 may be configured such that one edge thereof is movable along the rails 200 located on the roof and such that the other edge thereof is extendable.

The multifunction plate 300 is movable back and forth in the longitudinal direction of the vehicle, along the rails 200 located on both edges of the roof lining 100. More particularly, the multifunction plate 300 is configured such that one edge thereof is fastened with sleds 400 (see FIGS. 4A-4C) located inside the rails 200 and such that the other edge thereof is selectively extended.

As illustrated in FIGS. 3A-3D, a holder 110 is provided on the portion of the roof lining 100 adjacent to the front edge of the multifunction plate 300 to fix the multifunction plate 300 to the roof lining 100. In a fastened state of the holder 110, the multifunction plate 300 is stowed on the roof lining 100.

The multifunction plate 300 is configured such that the front edge (or the other edge) thereof is extended when the holder 110 is unfastened. One edge of the multifunction plate 300 is configured to be rotated while being fastened with the sleds 400 located on the rails 200. In addition, when the holder 110 is unfastened, the sleds 400 fastened with one edge of the multifunction plate 300 are controlled to move forwards. The radius of rotation of the multifunction plate 300 rotating in response to the deployment of the other edge thereof is reduced.

The holder 110 may include a pull-push fixing structure or a mechanical or electrical latch structure. In other words, the holder 110 according to the present disclosure may allow the extendable other edge of the multifunction plate 300 to be selectively attached to or detached from the roof lining 100.

Figure 5A:
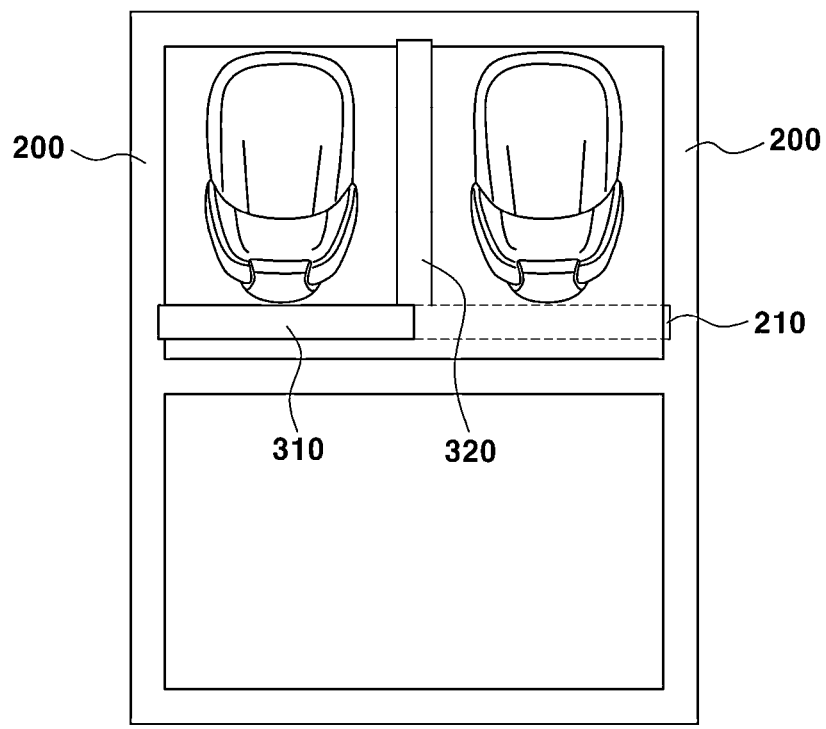
FIG. 5A is a plan view of the vehicle in which the vehicle roof lining including a multifunction plate is extended as a driver's partition.
Figure 5B:
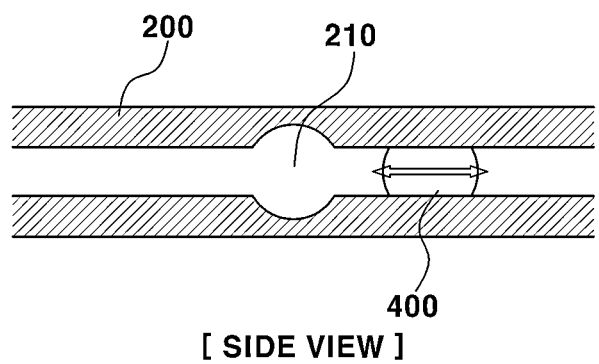
FIG. 5B illustrates a driving operation of the rail structure when the multifunction plate is serving as the driver's partition.
Figure 5B:
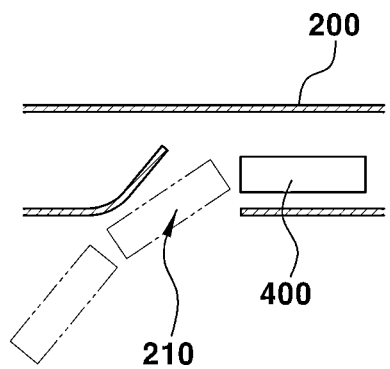
Figure 5C:
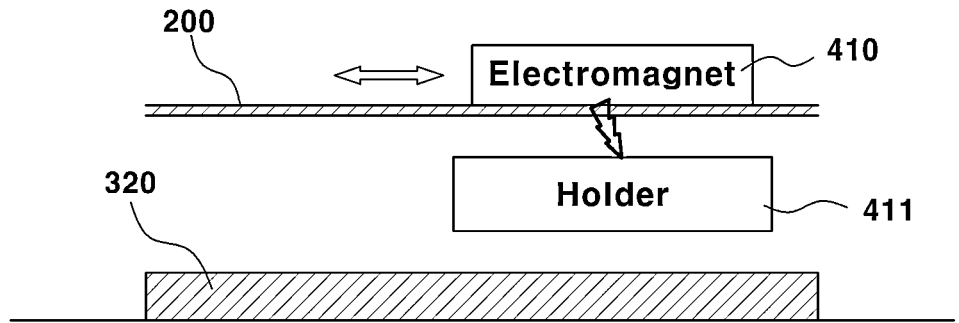
FIG. 5C illustrates examples of the sled.
Figure 5C:
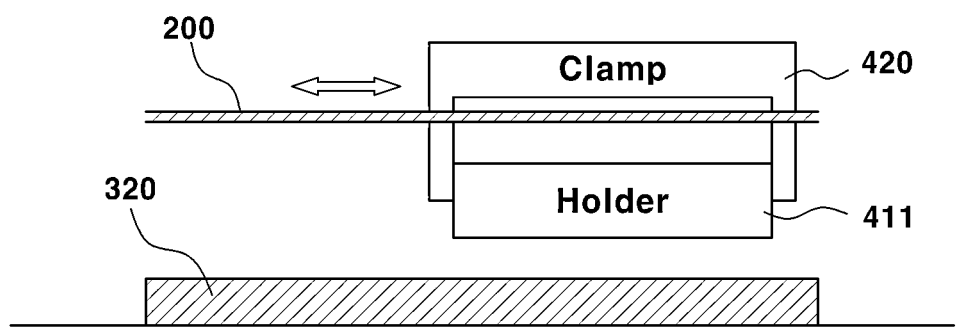

As illustrated, in part, in FIGS. 5A-5C, the rails 200 located on both edges of the roof lining 100 extend in the longitudinal direction of the vehicle. The sleds 400 are movable on the inner portions of the rails 200. The sleds 400 are fastened with one edge of the multifunction plate 300, allowing the multifunction plate 300 to rotate.

The rails 200 may be located on the inner surface portion of the rails of the sunroof 500 of the vehicle. In a vehicle without the sunroof 500, the rails 200 may be located on both edges of the vehicle roof.

The multifunction plate 300 may be a combination of one or more plates, each of which may telescope over an adjacent plate or rotate at a predetermined angle about one edge of an adjacent plate.

Figure 4A:
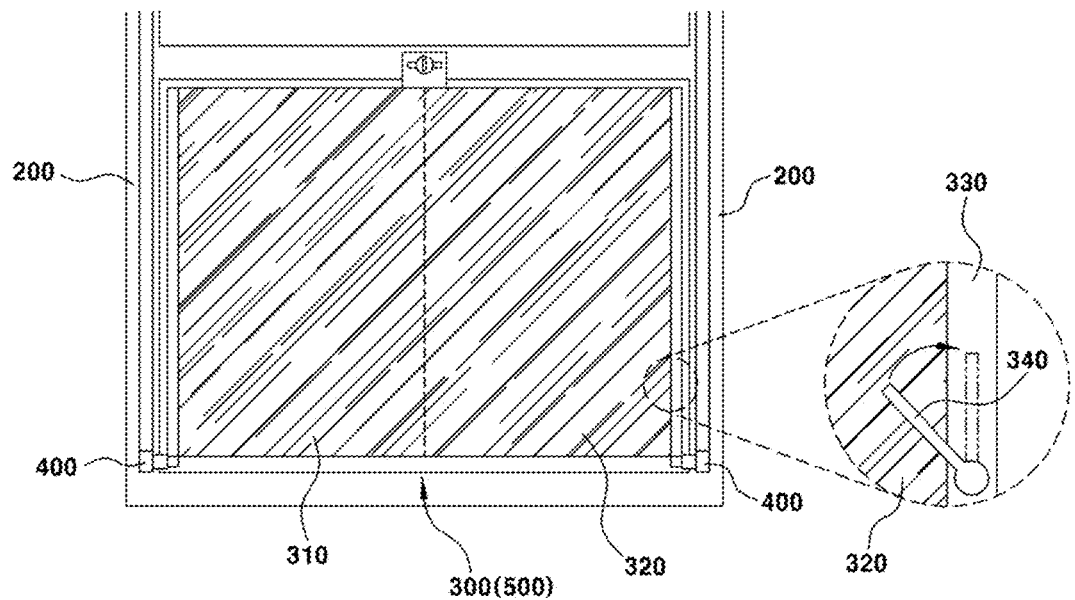
FIG. 4A is a rear view of the vehicle roof lining including a multifunction plate.
Figure 4B:
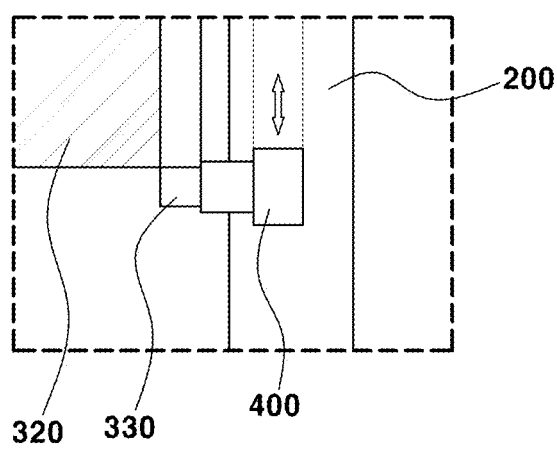
FIG. 4B is an enlarged view of the rail structure of the vehicle roof lining including a multifunction plate.
Figure 4C:
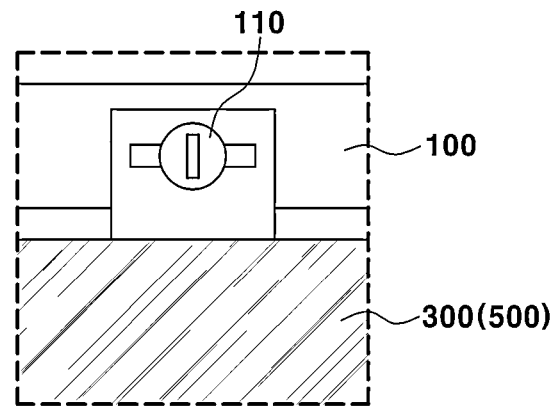
FIG. 4C is an enlarged view of the holder provided on the roof lining.

As shown in FIGS. 4A-4C, according to an embodiment of the present disclosure, the multifunction plate 300 is comprised of two plates. The multifunction plate 300 may include a first plate 310 disposed adjacent to the driver seat and a second plate 320 fastened with one edge of the first plate 310.

Frames 330 are provided on both side edges of the first plate 310 and the second plate 320, respectively. Both longitudinal ends of frames 330 are fastened with the sleds 400 located inside the rails 200.

The first plate 310 and the second plate 320 are configured to be simultaneously extended by lock pins 340 provided on the frames 330. When the lock pins 340 are unfastened, the first plate 310 and the second plate 320 are moved downwards in a top-bottom direction while remaining parallel to the roof lining 100.

Figure 6A:
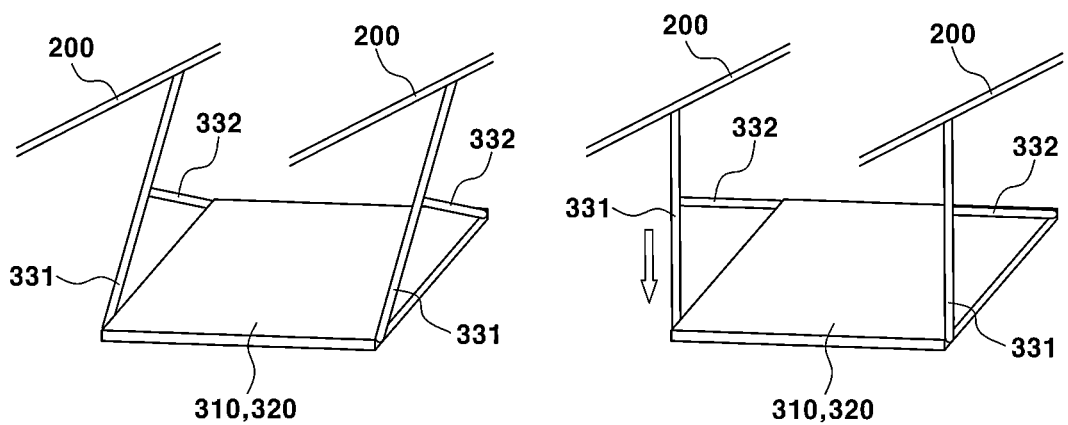
FIG. 6A illustrates a driving operation of the multifunction plate serving as a table.
Figure 6B:
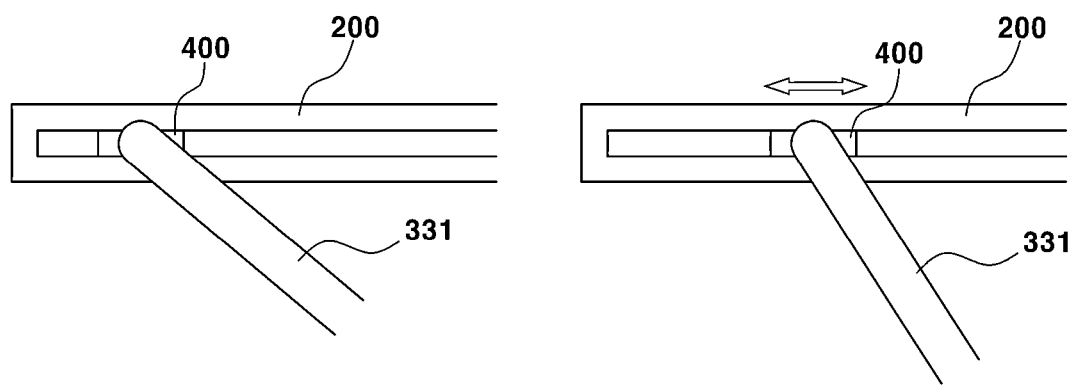
FIG. 6B illustrates a driving operation of the rail structure when the multifunction plate serves as a table.

As illustrated in FIGS. 6A and 6B, each of the frames 330 includes intermediate legs 332 located on outermost portions of the frame 330 and legs 331 provided between the respective plates and positioned adjacent to the intermediate legs 332. One end of each of the legs 331 is fastened with the corresponding sled 400 to move along the corresponding rail 200. The intermediate legs 332 may be fastened with the legs 331 to maintain the first plate 310 and the second plate 320 parallel to the roof lining 100.

More particularly, a height in which the first plate 310 and the second plate 320 are moved downwards parallel to the roof lining 100 may be adjusted within a height range depending on the positions of the sleds 400 respectively located on one end of the corresponding leg 331.

FIGS. 3A-3D sequentially illustrate driving operations in which the multifunction plate 300 is shifted from the stowed position to the extended position.

Figure 3A:
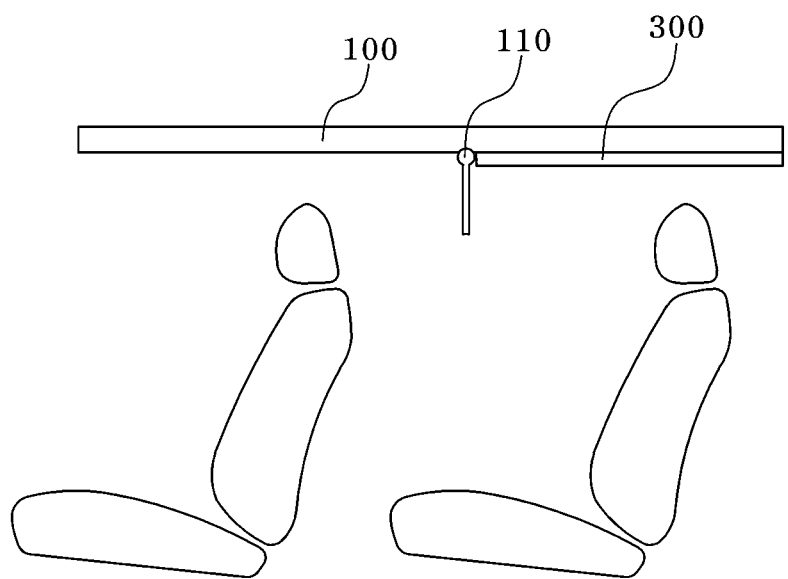
FIG. 3A is a side view of the vehicle cabin in which the vehicle roof lining including a multifunction plate is stowed.

As illustrated in FIG. 3A, the multifunction plate 300 is configured to be stowed in a position adjacent to the roof lining 100 while being parallel to the roof lining 100.

Figure 3B:
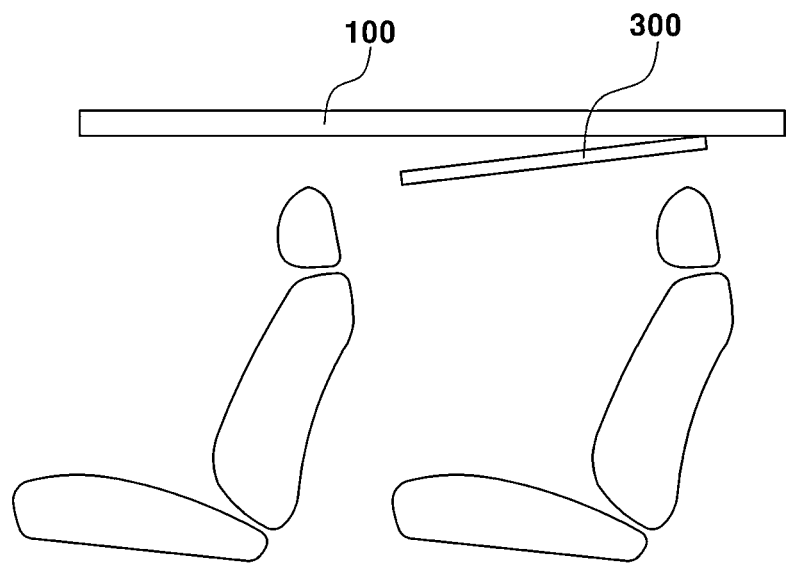
FIG. 3B is a side view of the vehicle cabin in which the multifunction plate is moved with respect to a roof lining.

When the holder 110, located on the front edge of the stowed multifunction plate 300, is unfastened, the multifunction plate 300 is extended as illustrated in FIG. 3B.

Figure 3C:
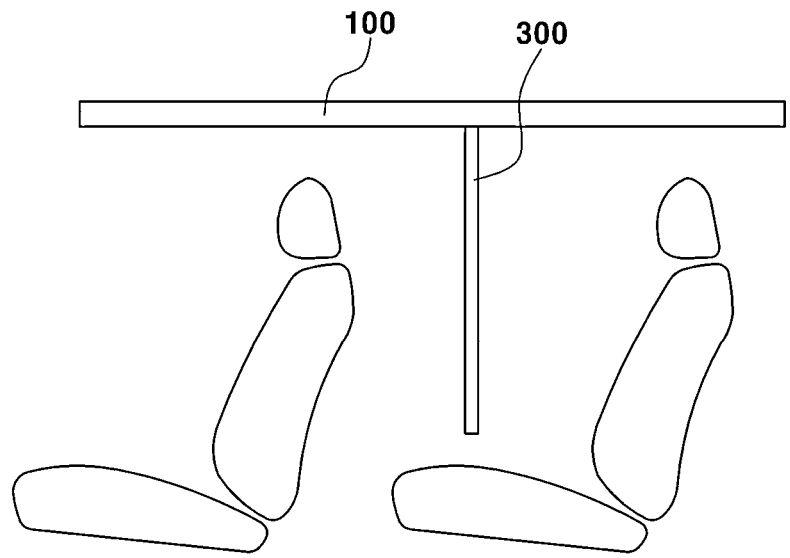
FIG. 3C is a side view of the vehicle cabin in which one edge of the multifunction plate is moved along a rail structure.

As illustrated in FIGS. 3B and 3C, in a position in which the holder 110, located on the front edge of the stowed multifunction plate 300, is unfastened, the front edge of the multifunction plate 300 is moved downwards. More particularly, the front edge of the multifunction plate 300 is rotated about the rear edge of the multifunction plate 300.

In a position in which the front edge of the multifunction plate 300 is moved downwards, the rear edge of the multifunction plate 300 is moved forwards. More particularly, the sleds 400, fastened with both corners of the rear edge of the multifunction plate 300, are moved along the rails 200 in the forward direction of the vehicle.

In this manner, in extending the multifunction plate 300, the front edge of the multifunction plate 300 is rotated, and the rear edge of the multifunction plate 300 is moved forwards in the longitudinal direction of the vehicle. Accordingly, the multifunction plate 300 may be rotated and opened without interference with either a front seat passenger or a rear seat passenger.

Figure 3D:
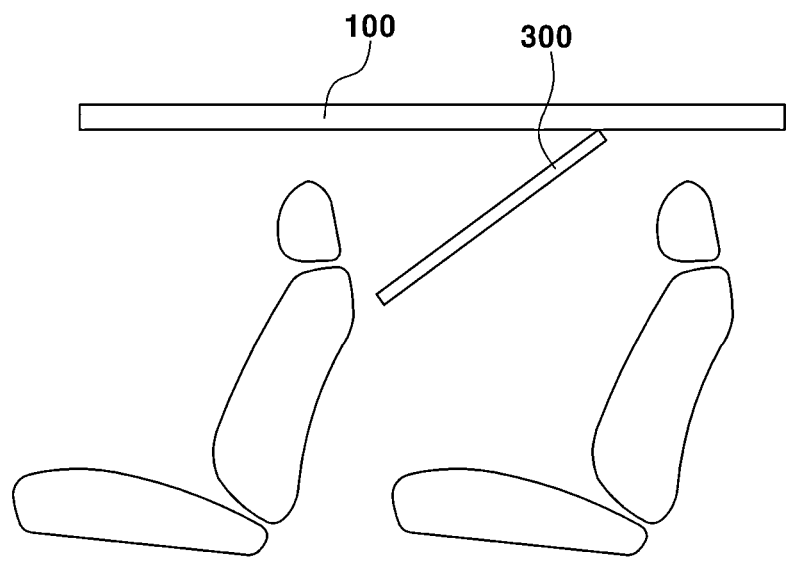
FIG. 3D is a side view of the vehicle cabin in which the multifunction plate is extended.

As illustrated in FIG. 3D, when the multifunction plate 300 is completely opened, the multifunction plate 300 may serve to partition the front seat passenger and the rear seat passenger from each other. In addition, an input image may be displayed using the multifunction plate 300.

In other words, the multifunction plate 300 according to the present disclosure serves to partition the front seats from the rear seats and is configured such that the radius of rotation thereof during the extending may be minimized.

FIGS. 4A-4C are enlarged views illustrating a fastening structure between the multifunction plate 300 and the rails 200 according to an embodiment of the present disclosure.

The multifunction plate 300 includes the frames 330 located on both edges adjacent to the rails 200. The frames 330 may be fixed by the lock pins 340 to move integrally with the first plate 310 and the second plate 320. In addition, the frames 330 may be located inside the rails 200 to be fastened with the sled 400 moving along the rails 200. The other edge of the multifunction plate 300 may be rotated about the frames 330 fastened with the sleds 400 so as to be opened.

More particularly, the lock pins 340 may allow the legs 331 and the intermediate legs 332 of the frames 330 to move integrally with the first plate 310 and the second plate 320. Thus, the multifunction plate 300 may be rotated about the sleds 400 to be opened. Here, when the lock pins 340 are unfastened, the legs 331 and the intermediate legs 332 may be driven independently of the first plate 310 and the second plate 320. Thus, the first plate 310 and the second plate 320 may be moved downwards in parallel with the roof lining 100.

In addition, as illustrated in FIG. 4C, the holder 110 provided on the roof lining 100 is located on the front edge of the multifunction plate 300. The holder 110 is configured to fix the front edge of the multifunction plate 300 to the roof lining 100.

According to an embodiment of the present disclosure, the initial holder 110 may be unfastened to release the multifunction plate 300 and the roof lining 100 from fixed positions. The sleds 400 may move forward simultaneously with downward movement of the front edge of the multifunction plate 300 in order to perform an operation to extend the front edge of the multifunction plate 300 so that the multifunction plate 300 serves to partition the front seats from the rear seats.

In the above-described process, the lock pins 340 may maintain the legs 331, intermediate legs 332, the first plate 310, and the second plate 320 in fastened positions so that the legs 331, intermediate legs 332, the first plate 310, and the second plate 320 move integrally.

As a result, in the position in which the lock pins 340 are fastened, the legs 331, intermediate legs 332, the first plate 310, and the second plate 320 may move integrally. The multifunction plate 300 may serve as a single plane to partition the front seats from the rear seats. In contrast, in a position in which the lock pins 340 are unfastened, the first plate 310 and the second plate 320 may be extended into the internal space of the cabin as a table. This feature is described with reference to FIGS. 6A and 6B hereinbelow.

FIGS. 5A-5C are schematic views illustrating a configuration for performing a partition function in a portion of a front seat area after the multifunction plate 300 is extended in a direction perpendicular to the roof lining 100.

FIGS. 5A and 5B illustrate driving operations according to the present disclosure in which the respective plates are rotated about the central axis extending in the height direction of the vehicle after the multifunction plate 300 has been extended. In other words, the second plate 320 may be rotated back and forth about one edge of the first plate 310 or the first plate 310 may be rotated back and forth about one edge of the second plate 320. The driver's seat or the front seat next to the driver's seat may be provided as an independent area, or an independent area may be provided to a right or left rear seat passenger.

According to an embodiment of the present disclosure, the second plate 320 may be rotated about one end of the first plate 310 adjacent to the driver's seat. In a position in which the multifunction plate 300 is extended, a portion of the front seats may be partitioned as an independent space.

The frames 330 located on the side edges of the second plate 320 may include sleds 400 detachably attached to the rails 200. More particularly, according to an embodiment of the present disclosure, when the second plate 320 is moved along the rails 200 to an area facing an opening 210, the sleds 400 fastened to the second plate 320 may be spaced apart from the rails 200.

The opening 210 may be curved along the radius of rotation of the second plate 320. The sleds 400 may be mechanically attached to or detached from the rails 200.

According to another embodiment of the present disclosure, as illustrated in FIG. 5C, the sleds 400 may be implemented as electromagnets 410 or clamps 420. Each of the sleds 400 may include a holder 411 for fixing the frame 330 in a position corresponding to the sled 400 located on the rail 200. Thus, when the second plate 320 is rotated about one edge of the first plate 310, the frames 330 located on side edges of the second plate 320 may be unfastened from the sleds 400. The side edges of the second plate 320, unfastened in this manner, may be rotated forwards or backwards.

The sleds 400, implemented as the clamps 420, respectively include a holder protruding into the opening of the respective rails 200. The holder may be fastened with at least a portion of the multifunction plate 300.

The holder 411 of the second plate 320 of the multifunction plate 300 may be selectively fastened with or unfastened from the clamp 420. A portion of the clamp 420 is located on the rail 200. The holder 411, unfastened from the clamp 420, may allow the second plate 320 to be rotated back and forth about one edge adjacent to the first plate 310.

More particularly, when the sleds 400 are implemented as the electromagnets 410 or the clamps 420, the rails 200 may be controlled so that the frames 330 may be unfastened from the sleds 400 without the opening 210. Thus, the first plate 310 or the second plate 320 may be selectively rotated in the transverse direction of the vehicle.

According to an embodiment of the present disclosure, the side edge of the second plate 320 released from the rails 200 may be rotated forwards and may be fixed to a front fastening area.

More particularly, the side edge of the second plate 320 may be fixed to the fastening area located in the roof lining 100. The driver's seat may be shifted into a shape with three sides thereof being enclosed.

As described above, the second plate 320 or the first plate 310 may be rotated about one edge of the other plate adjacent thereto. Accordingly, the multifunction plate 300 may partition the right and left front seats from each other or the right and left rear seats from each other.

FIGS. 6A and 6B illustrate an extended position of the legs 331 and the intermediate legs 332 in the unfastened position of the lock pins 340.

As illustrated in FIGS. 6A and 6B, when the lock pins 340, which fix the frames and the first and second plates 310 and 320, are unfastened, the legs 331 and the intermediate legs 332 may be extended. The first plate 310 and the second plate 320, fastened to the corresponding ends of the legs 331 and the intermediate legs 332, may be moved downwards to be substantially parallel to the roof lining 100.

More specifically, one end of each of the legs 331 may be located on a rear end portion of the corresponding rail 200, and the other end of each of the legs 331 may be located on the corner of the front edge of the corresponding one of the first plate 310 and the second plate 320. In addition, one end of each of the intermediate legs 332 may be located on a portion of the corresponding leg 331 adjacent to the central portion of the leg 331, and the other end of each of the intermediate legs 332 may be located on the corner of the rear edge of the corresponding one of the first plate 310 and the second plate 320. Accordingly, the intermediate legs 332 and the legs 331 may be moved so that the first plate 310 and the second plate 320 remain parallel to the roof lining 100.

In addition, when one end of each of the legs 331 is moved forwards along the rail 200, the height of the corresponding one of the first plate 310 and the second plate 320 may be lowered, and the intermediate legs 332 may move along slots in the legs 331.

As described above, the multifunction plate 300 according to the present disclosure may be extended downwards while being parallel to the roof lining 100, may be located between the front seat area and the rear seat area, and may provide a table function for the purpose of user convenience.

In addition, one end of each of the legs 331 may be moved along the corresponding rail 200 so that the height of the multifunction plate 300 is adjusted. Accordingly, user convenience may be improved.

The foregoing detailed descriptions are merely examples of the prevent disclosure. Also, the inventive concept is explained by describing the disclosed embodiments and may be used through various combinations, modifications, and environments. In other words, the inventive concept may be amended or modified within the scope, technical idea, or knowledge in the art. Further, it is not intended that the scope of this application be limited to these specific embodiments or to their specific features or benefits. Rather, it is intended that the scope of this application be limited solely to the following claims and to their equivalents. Further, the appended claims should be appreciated as a step including even another embodiment.

What is claimed is:

1. A vehicle roof lining structure comprising:
a roof lining;
a rail structure provided on both side edges of the roof lining;
a multifunction plate provided on the roof lining, with one edge of the multifunction plate being movable along the rail structure; and
sleds movable along inner portions of the rail structure and fastened with the one edge of the multifunction plate,
wherein the multifunction plate includes a first plate provided in a position opposing a driver's seat and a second plate configured to rotate relative to the first plate about an edge of the first plate.

2. The vehicle roof lining structure according to claim 1, wherein the multifunction plate includes frames respectively provided on at least a portion of each of both side edges of the roof lining, the frames being fastened with the sleds.

3. The vehicle roof lining structure according to claim 2, further comprising a lock pin provided on each of the frames to fix the first plate and the second plate to the frames.

4. The vehicle roof lining structure according to claim 3, wherein, when the lock pins are unfastened, the first plate and the second plate are moved downwards while being parallel to the roof lining.

5. The vehicle roof lining structure according to claim 2, wherein each of the frames includes:
- a leg, one end thereof being located on a corresponding one of the first plate and the second plate, and the other end thereof being located on a corresponding one of the sleds; and
- an intermediate leg, one end thereof being located on the corresponding one of the first plate and the second plate, and the other end thereof being fastened with the leg,
- wherein the leg and the intermediate leg are configured to be extended when the corresponding one of the first plate and the second plate is moved downwards.

6. The vehicle roof lining structure according to claim 5, wherein the legs are movable along the rail structure so that an extended height of the first plate and the second plate is adjustable.

7. The vehicle roof lining structure according to claim 1, further comprising a holder provided on a front edge of the multifunction plate, the holder being selectively fastened with the roof lining.

8. The vehicle roof lining structure according to claim 7, wherein, when the holder is unfastened, the front edge of the multifunction plate is extended downwards.

9. The vehicle roof lining structure according to claim 8, wherein, when the front edge of the multifunction plate is extended downwards, the sleds are moved in a forward direction of a vehicle.

10. The vehicle roof lining structure according to claim 1, wherein an opening is provided in at least one end of the rail structure facing one edge of the second plate.

11. The vehicle roof lining structure according to claim 10, wherein, in a position facing the opening, the sled is attachable to or detachable from the rail structure in a direction of rotation of the second plate.

12. The vehicle roof lining structure according to claim 11, wherein an edge of the second plate detached from the rail structure is configured to be re-fastened with a front edge of the roof lining.

13. The vehicle roof lining structure according to claim 1, wherein each of the sleds includes:
- an electromagnet movable along the rail structure; and
- a holder fastened with the electromagnet and located on a side edge of the multifunction plate.

14. The vehicle roof lining structure according to claim 12, wherein the holder is selectively attachable to or detachable from the electromagnet.

15. The vehicle roof lining structure according to claim 1, wherein each of the sleds includes:
- a clamp movable along the rail structure; and
- a holder fastened with the clamp and located on a side edge of the multifunction plate.

16. The vehicle roof lining structure according to claim 1, wherein the multifunction plate comprises a transparent display.

* * * * *